US009498754B2

(12) United States Patent
Kawakatsu et al.

(10) Patent No.: US 9,498,754 B2
(45) Date of Patent: Nov. 22, 2016

(54) METHOD FOR IMPROVING REJECTION OF REVERSE OSMOSIS MEMBRANE, TREATMENT AGENT FOR IMPROVING REJECTION, AND REVERSE OSMOSIS MEMBRANE

(75) Inventors: Takahiro Kawakatsu, Tokyo (JP); Tetsuya Aoki, Tokyo (JP); Kunihiro Hayakawa, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 176 days.

(21) Appl. No.: 13/985,666

(22) PCT Filed: Mar. 5, 2012

(86) PCT No.: PCT/JP2012/055549
§ 371 (c)(1),
(2), (4) Date: Aug. 15, 2013

(87) PCT Pub. No.: WO2012/121208
PCT Pub. Date: Sep. 13, 2012

(65) Prior Publication Data
US 2013/0324664 A1    Dec. 5, 2013

(30) Foreign Application Priority Data

Mar. 9, 2011    (JP) .................................. 2011-051530
Feb. 21, 2012    (JP) .................................. 2012-035277

(51) Int. Cl.
*B01D 67/00*        (2006.01)
*B01D 65/00*        (2006.01)
(Continued)

(52) U.S. Cl.
CPC .......... *B01D 67/0097* (2013.01); *B01D 65/108* (2013.01); *B01D 67/0093* (2013.01); *B01D 71/56* (2013.01); *B01D 61/025* (2013.01); *B01D 2311/12* (2013.01); *C02F 1/441* (2013.01)

(58) Field of Classification Search
CPC .......... B01D 67/0097; B01D 67/0081; B01D 67/00; B01D 65/108; B01D 65/106; B01D 65/10; B01D 65/00; B01D 67/0093; B01D 71/56; B01D 71/06; B01D 71/00; B01D 2311/12; B01D 2311/00; B01D 61/025; B01D 61/02; B01D 61/00; C02F 1/441
USPC ................ 525/54.2, 50; 252/182.24, 182.23, 252/182.13, 182.12, 182.11, 182.28, 420, 252/419, 418, 50; 210/500.38, 500.37, 210/500.27, 500.21, 500.1
See application file for complete search history.

(56) References Cited

U.S. PATENT DOCUMENTS 3,373,056 A  * 3/1968 Martin ................. B01D 69/141
                                                 210/639
3,886,066 A    5/1975 Chen et al.
(Continued)

FOREIGN PATENT DOCUMENTS

JP    H02-002827 A    1/1990
JP    H02-068102 A    3/1990
(Continued)

OTHER PUBLICATIONS

Nagai et al., Desalination, vol. 96 (1994), 291-301; The behavior of an oxidizing/reducing agent in seawater.
(Continued)

*Primary Examiner* — David C Mellon
*Assistant Examiner* — Liam Royce
(74) *Attorney, Agent, or Firm* — Manabu Kanesaka (57) ABSTRACT

A method capable of effectively improving a rejection of a reverse osmosis membrane without remarkably reducing a permeation flux, even if the membrane is seriously degraded. An aqueous solution containing a first organic compound having a molecular weight of less than 200, a second organic compound having a molecular weight of 200 to less than 500, and a third organic compound having a molecular weight of 500 or more is passed through the reverse osmosis membrane. The first organic compound is preferably an amino acid or an amino acid derivative. The total concentration of the first organic compound and the second organic compound and the concentration of the third organic compound are each preferably 1 to 500 mg/L.

20 Claims, 2 Drawing Sheets

(51) Int. Cl.
*B01D 71/56* (2006.01)
*B01D 61/02* (2006.01)
*C02F 1/44* (2006.01)
*B01D 65/10* (2006.01)

(56) References Cited

U.S. PATENT DOCUMENTS

| | | | |
|---|---|---|---|
| 4,634,531 A * | 1/1987 | Nakagawa et al. | 210/639 |
| 4,983,291 A | 1/1991 | Chau et al. | |
| 5,755,964 A * | 5/1998 | Mickols | 210/500.37 |
| 2005/0147579 A1* | 7/2005 | Schneider | C09D 5/1687 424/78.09 |
| 2006/0032823 A1* | 2/2006 | Harrison et al. | 210/754 |
| 2006/0065598 A1 | 3/2006 | Comstock | |
| 2009/0074926 A1* | 3/2009 | Otto et al. | 426/324 |
| 2009/0232892 A1* | 9/2009 | Yamasaki et al. | 424/489 |
| 2010/0006495 A1* | 1/2010 | Buschmann | B01D 67/0006 210/500.25 |
| 2012/0046248 A1* | 2/2012 | Jones et al. | 514/126 |
| 2012/0080058 A1* | 4/2012 | Isaias | B01D 61/025 134/28 |

FOREIGN PATENT DOCUMENTS

| | | |
|---|---|---|
| JP | H02-115027 A | 4/1990 |
| JP | H07-308671 A | 11/1995 |
| JP | 2000-504270 A | 4/2000 |
| JP | 2006-110520 A | 4/2006 |
| JP | 2007-289922 A | 11/2007 |
| JP | 2008-086945 A | 4/2008 |
| JP | 2009-172531 A | 7/2009 |
| WO | 2011/040354 A1 | 4/2011 |
| WO | 2012046141 A2 | 4/2012 |

OTHER PUBLICATIONS

Satoh and Tamura, Kagaku Kogaku Ronbunnshu vol. 34 (2008), 493-498.
Uemura et al., Bulletin of the Society of Sea Water Science, Japan, 57, 498-507 (2003).
Yoshiyasu Kamiyama, Hyomen (Surface), vol. 31, No. 5 (1993), 408-418.
S.T. Mitrouli, A.J. Karabelas, N.P. Isaias, D.C. Sioutopoulos, and A.S. Al Rammah, Reverse Osmosis Membrane Treatment Improves Salt-Rejection Performance, IDA Journal I Second Quarter 2010, p. 22-34 Object and Summary of Invention.
Europe Patent Office, "Search Report for EP 12755214.9," Jul. 29, 2014.
Ebrahim, S. et al., "Evaluation of commercial cleaning agents for seawater reverse osmosis membranes," Desalination, 1994, pp. 169-188, vol. 99, Elsevier Science B.V., Amsterdam, NL.

* cited by examiner

FIG.1

NORMAL MEMBRANE

DEGRADED MEMBRANE

FIG. 2

METHOD FOR IMPROVING REJECTION OF REVERSE OSMOSIS MEMBRANE, TREATMENT AGENT FOR IMPROVING REJECTION, AND REVERSE OSMOSIS MEMBRANE

FIELD OF INVENTION

The present invention relates to a method for improving a rejection (salt rejection) of a reverse osmosis membrane, and particularly relates to a method for restoring a degraded reverse osmosis (RO) membrane to effectively improve the rejection thereof.

The present invention also relates to a reverse osmosis membrane treated by a rejection improving treatment using the method for improving a rejection of a reverse osmosis membrane and a treatment agent for improving a rejection to be used in this method.

BACKGROUND OF INVENTION

RO membranes have been used in ultrapure water production plants, wastewater recovery plants, seawater desalination plants, and the like and can remove most of organic substances, inorganic substances, and the like contained in water.

A rejection of a permeable membrane including an RO membrane, to substances such as inorganic electrolytes and water soluble organic substances, is decreased by degradation of a high molecular weight base material due to influences of oxidizing substances, reducing substances, and the like present in water and other causes, and as a result, required treated water quality may not be obtained in some cases. This degradation may gradually occur during long-term use or may suddenly occur by an accident in some cases. In some cases, the rejection of a fresh permeable membrane may not satisfy a level required as a product.

In a permeable membrane system using an RO membrane or the like, raw water is treated in a pre-treatment step using chlorine (such as sodium hypochlorite) in order to prevent biofouling caused by slime on a membrane surface. However, when water containing residual chlorine at a high concentration is supplied to a permeable membrane, the permeable membrane is degraded since chlorine has a strong oxidizing action.

In order to decompose residual chlorine in water to be treated, a reducing agent such as sodium bisulfite is sometimes added to water to be treated. However, when a metal such as Cu and/or Co is contained in the water to be treated, even if a large amount of sodium bisulfite is added to the water, an RO membrane is degraded (Patent Document 1 and Non-Patent Document 1). When the permeable membrane is degraded, the rejection thereof is decreased.

The following methods have been proposed as a method for improving a rejection of a permeable membrane such as an RO membrane:

i) A method for improving a rejection of a permeable membrane by adhesion of an anionic or a cationic high molecular weight compound to a membrane surface has been disclosed (Patent Document 2).

In the method described above, an effect of improving the rejection of a degraded membrane is not sufficient.

ii) A method for improving a rejection of a nanofiltration membrane or an RO membrane by adhesion of a compound having a poly(alkylene glycol) chain to a membrane surface has been disclosed (Patent Document 3).

This method is also not a method which sufficiently improves the rejection of a degraded membrane without remarkably reducing a permeation flux.

iii) A method for preventing membrane contamination and/or degradation in quality of permeated water has been disclosed in which a treatment using a nonionic surfactant is performed on a nanofiltration membrane or an RO membrane having an increased permeation flux and an anionic charge to reduce the permeation flux to an appropriate range (Patent Document 4). In this method, the nonionic surfactant is brought into contact with and is adhered to a membrane surface so as to set the permeation flux to a range of +20% to −20% of that at the start of use.

In order to improve a rejection of a seriously degraded membrane (membrane having a salt rejection decreased to 95% or less) by this method, a considerable amount of the surfactant is required to be adhered to the membrane surface, and as a result, a remarkable decrease in permeation flux may occur in some cases. One example of the above Patent Document 4 has disclosed that an aromatic polyamide RO membrane having a permeation flux of 1.20 $m^3/m^2$·day, a NaCl rejection of 99.7%, and a silica rejection of 99.5% as the initial performance at a production stage is used for 2 years, and the membrane thus obtained is used as an oxidation degraded membrane. In Patent Document 4, a membrane having a NaCl rejection of 99.5% and a silica rejection of 98.0%, which is not so much degraded, is used as an object, and it has not been disclosed that by the method described above, the rejection of a degraded permeable membrane is sufficiently improved.

iv) A method for improving the salt rejection by adhesion of a tannic acid or the like to a degraded membrane has been disclosed (Non-Patent Document 2).

However, an effect of improving the rejection obtained by this method is not significant. For example, even when the salt rejection of a degraded RO membrane, ES20 (manufactured by Nitto Denko Corp.) or SUL-G20F (manufactured by Toray Industries, Inc.), is improved by this method, a solute concentration of permeated water through the membrane after the improvement cannot be decreased to ½ of that of permeated water through the membrane before the improvement.

v) A method for improving a rejection of an RO membrane by addition of a poly(vinyl methyl ether) (PVME) to a tannic acid has been disclosed (Non-Patent Document 5). In this method, the concentration of the chemical agent to be used is relatively high, such as 10 ppm or more. In addition, when the membrane is treated by this method, the permeation flux of the membrane is decreased by approximately 20%. Furthermore, the rejection may be hardly improved in some cases.

Non-Patent Documents 3 and 4 have disclosed that in a polyamide membrane degraded by an oxidizing agent, the C—N bond of the polyamide linkage of a membrane base material is broken, and hence an inherent sieve structure of the membrane is destroyed.

The related rejection improving methods described above have the following problems a to c.

a) Since a substance is newly adhered to the surface of the permeable membrane, the permeation flux thereof is reduced. For example, when a degraded membrane is treated by a rejection improving treatment so that the solute concentration of water permeated through the membrane which is treated by a rejection recovery treatment is decreased to ½ of that of water permeated through the membrane which is not yet treated by the recovery treatment, in some cases, the permeation flux may be considerably decreased by 20% or more as compared to that before the treatment is performed.

b) When a chemical agent having a high concentration is added, TOC of brine separated by the membrane is increased. In addition, it is not easy to restore the membrane while water to be treated is supplied through the membrane and is collected.

c) For a membrane which is seriously degraded, the rejection thereof is not easily recovered.

CITATION LIST

Patent Document

Patent Document 1: Japanese Patent Publication 7-308671A
Patent Document 2: Japanese Patent Publication 2006-110520A
Patent Document 3: Japanese Patent Publication 2007-289922A
Patent Document 4: Japanese Patent Publication 2008-86945A Non-Patent Document Non-Patent Document 1: Nagai et al., Desalination, Vol. 96 (1994), 291-301
Non-Patent Document 2: Satoh and Tamura, Kagaku Kogaku Ronbunnshu Vol. 34 (2008), 493-498
Non-Patent Document 3: Uemura et al., Bulletin of the Society of Sea Water Science, Japan, 57, 498-507 (2003)
Non-Patent Document 4: Yoshiyasu Kamiyama, Hyomen (Surface), Vol. 31, No. 5 (1993), 408-418
Non-Patent Document 5: S. T. Mitrouli, A. J. Karabelas, N. P. Isaias, D. C. Sioutopoulos, and A. S. Al Rammah, Reverse Osmosis Membrane Treatment Improves Salt-Rejection Performance, IDA Journal I Second Quarter 2010, p 22-34

OBJECT AND SUMMARY OF INVENTION

An object of the present invention is to solve related technical problems described above and is to provide a method for improving a rejection of a reverse osmosis membrane, the method being capable of effectively improving the rejection of a reverse osmosis membrane, even if the membrane is seriously degraded, without remarkably reducing a permeation flux, and a treatment agent used for the method described above.

Another object of the present invention is to provide a reverse osmosis membrane treated by a rejection improving treatment using the method for improving a rejection of a reverse osmosis membrane as described above.

In order to accomplish the above objects, intensive investigation was carried out by the present inventors through repeatedly performed examination and analysis of degraded membranes using actual machines, and finally the following findings were obtained.

1) In the conventional method in which a hole formed in a membrane by degradation thereof is filled up by adhesion of a new substance (such as a compound including a nonionic surfactant or a cationic surfactant) to the membrane, the permeation flux of the membrane is remarkably reduced because of hydrophobization of the membrane and adhesion of a high molecular weight compound thereto, and hence, it is difficult to secure the amount of water.

2) In a reverse osmosis membrane such as a polyamide membrane, the C—N bond of the polyamide is broken by degradation caused by an oxidizing agent, and the inherent sieve structure of the membrane is destroyed. At degraded portions of the membrane, although the amide groups are lost by the breakage of the amide linkages, some carboxyl groups remain.

3) When an amino compound is made to be efficiently adhered and bonded to this carboxyl group of the degraded membrane, the degraded membrane is restored, and hence the rejection thereof can be recovered. When a low molecular weight compound having an amino group is used as the amino compound to be bonded to the carboxyl group, remarkable reduction in permeation flux caused by hydrophobization of a membrane surface and adhesion of a high molecular weight compound thereto can be suppressed.

The present invention has been completed based on the findings as described above.

The method for improving a rejection of a reverse osmosis membrane of the present invention includes a step of passing an aqueous solution containing a first organic compound having a molecular weight of less than 200, a second organic compound having a molecular weight of 200 to less than 500, and a third organic compound having a molecular weight of 500 or more through the reverse osmosis membrane.

The organic compound having a molecular weight of less than 200 is preferably an amino acid or an amino acid derivative.

The organic compound having a molecular weight of 500 or more preferably has a cyclic structure.

The salt rejection of the reverse osmosis before the aqueous solution is supplied therethrough is preferably 95% or less and particularly preferably 90% or less.

The total concentration of the first organic compound and the second organic compound in the aqueous solution is preferably 1 to 500 mg/L, and the concentration of the third organic compound is preferably 1 to 500 mg/L.

The time for the solution passing step described above is preferably 3 to 500 hours.

The reverse osmosis membrane of the present invention is treated by a rejection improving treatment using the method for improving a rejection of a reverse osmosis membrane described above.

The treatment agent for improving a rejection of a reverse osmosis membrane of the present invention includes a first organic compound having a molecular weight of less than 200, a second organic compound having a molecular weight of 200 to less than 500, and a third organic compound having a molecular weight of 500 or more.

Advantageous Effects of Invention

According to the present invention, when an aqueous solution containing the first organic compound having a molecular weight of less than 200, the second organic compound having a molecular weight of 200 to less than 500, and the third organic compound having a molecular weight of 500 or more is supplied through a reverse osmosis membrane degraded by an oxidizing agent or the like, without remarkably reducing a permeation flux of this reverse osmosis membrane, degraded portions of the membrane can be restored, and hence the rejection thereof can be effectively improved.

In particular, when the solution is passed so that the minimum organic-compound contact amount per membrane unit area is 2,500 mg/m$^2$ or more and preferably 2,500 to 1,000,000 mg/m$^2$, without remarkably reducing a permeation flux of this reverse osmosis membrane, degraded portions of the membrane can be restored, and hence the rejection thereof can be effectively improved.

Hereinafter, a mechanism of restoring a degraded membrane by the present invention will be described with reference to FIG. 1.

Figure 1:
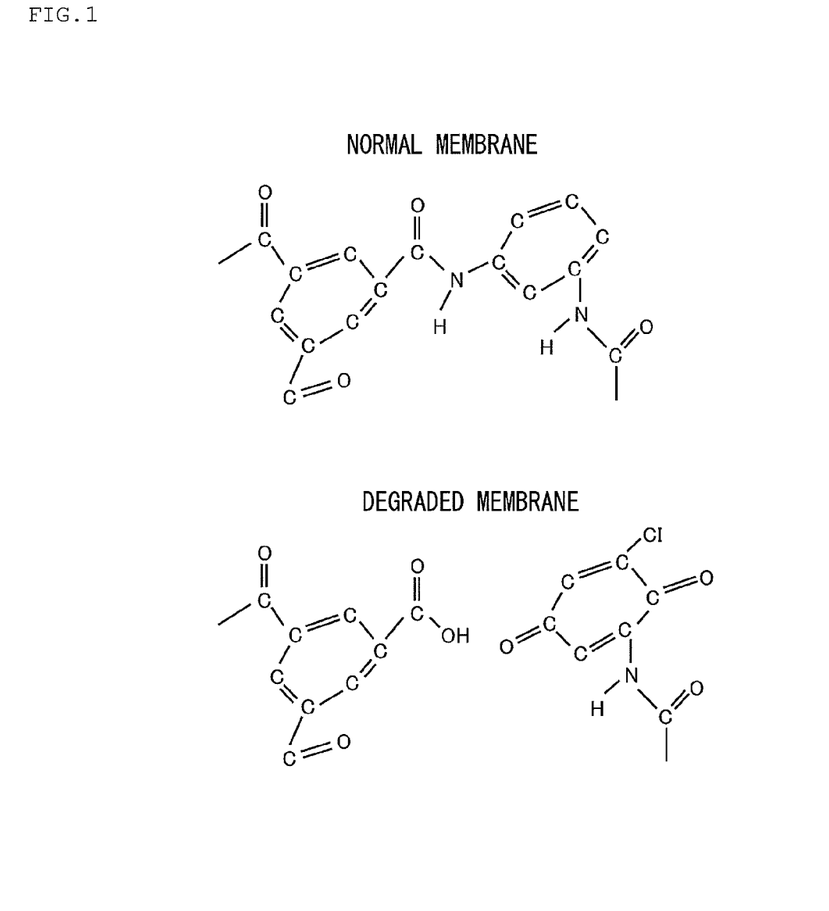
FIG. 1 includes chemical structure formulas illustrating a mechanism of a rejection improving treatment of the present invention.

A reverse osmosis membrane such as a polyamide membrane having a normal amide linkage has the structure as represented by a normal membrane shown in FIG. 1. When this membrane is degraded by an oxidizing agent such as chlorine, the C—N bond of the amide linkage is broken, whereby the structure as shown by a degraded membrane in FIG. 1 is formed.

As shown by the degraded membrane in FIG. 1, although the amino group may be lost in some cases by the breakage of the amide linkage, a carboxyl group is formed on at least part of this breakage portion.

As the degradation proceeds, the size of gap is increased, and gaps having various sizes are formed. When the first to the third organic compounds are fixed in accordance with the size of the gap, holes having various sizes of the degraded membrane are restored, and the rejection of the membrane is recovered.

When an aqueous solution containing a plurality of amino compounds having different molecular weights and skeletons (structures) is allowed to pass through a degraded membrane, the compounds described above interfere with each other when being allowed to pass through the membrane, and as a result, residence times of the compounds at degraded portions in the membrane are increased. Accordingly, the contact probability between the carboxyl group of the membrane and the amino group of the low molecular weight amino compound is increased, and hence, efficiency of restoring the membrane is increased.

In particular, when an aqueous solution containing the third organic compound having a molecular weight of 500 or more is allowed to pass through a membrane, a large degraded portion of the membrane can be filled up, and the restoring efficiency is increased. The third organic compound may be a compound having a functional group (cationic group: a primary to a tertiary amino group) which interacts with the carboxyl group of the membrane, a compound having a functional group (anionic group: a carboxyl group or a sulfonic group) which interacts with a compound having an amino group in the treatment agent for improving a rejection, a compound having a functional group (a hydroxyl group) which interacts with the polyamide membrane, or a compound having a cyclic structure.

When the minimum organic-compound contact amount per membrane unit area is set to 2,500 mg/m² or more, the size of a large degraded portion of the membrane is gradually decreased as the organic compound described above is adsorbed, and finally the membrane is restored so that the hole therein is filled up. Even if the degraded portion is present inside the membrane, when the minimum organic-compound contact amount per membrane unit area is set to 2,500 mg/m² or more, the organic compound is sufficiently infiltrated into the membrane, and as a result, the degraded portion is restored.

DESCRIPTION OF EMBODIMENTS

Hereinafter, embodiments of the present invention will be described in detail.

[Method for Improving Rejection of Reverse Osmosis Membrane]

A method for improving a rejection of a reverse osmosis membrane of the present invention includes a step of passing an aqueous solution containing a first organic compound having a molecular weight of less than 200, a second organic compound having a molecular weight of 200 to less than 500, and a third organic compound having a molecular weight of 500 or more through a permeable membrane. Hereinafter, the aqueous solution containing these organic compounds is referred to as the "rejection improving aqueous solution" in some cases.

The rejection improving aqueous solution is supplied so that the minimum organic-compound contact amount per membrane unit area is 2,500 mg/m² or more and preferably 2,500 to 1,000,000 mg/m².

<Treatment Agent for Improving Rejection>

In the present invention, as the first organic compound having a molecular weight of less than 200 and the second organic compound having a molecular weight of 200 to less than 500, the following may be mentioned by way of example.

Aromatic amino compounds: Compounds having a benzene skeleton and an amino group, such as aniline (molecular weight: 93) and diamino benzene (molecular weight: 108).

Aromatic amino carboxylic acid compounds: Compounds having a benzene skeleton, at least two amino groups, and at least one carboxyl group, the number of which is smaller than that of the amino groups, such as 3,5-diamino benzoic acid (molecular weight: 152), 3,4-diamino benzoic acid (molecular weight: 152), 2,4-diamino benzoic acid (molecular weight: 152), 2,5-diamino benzoic acid (molecular weight: 152), and 2,4,6-triamino benzoic acid (molecular weight: 167).

Aliphatic amino compounds: Compounds having a linear hydrocarbon group of approximately 1 to 20 carbon atoms and at least one amino group, such as methylamine (molecular weight: 31), ethylamine (molecular weight: 45), octylamine (molecular weight: 129), and 1,9-diaminononane (in this specification, abbreviated as "NMDA" in some cases) ($C_9H_{18}(NH_2)_2$) (molecular weight: 158), and compounds each having a branched hydrocarbon group of approximately 1 to 20 carbon atoms and at least one amino group, such as 1-aminopentane (in this specification, abbreviated as "IAAM" in some cases) ($C_5H_{13}N$) (molecular weight: 87) and 2-methyl-1,8-octanediamine (in this specification, abbreviated as "MODA" in some cases) ($NH_2CH_2CH(CH_3)(CH_2)_6NH_2$) (molecular weight: 158).

Aliphatic amino alcohols: Compounds having a linear or a branched hydrocarbon group of 1 to 20 carbon atoms, an amino group, and a hydroxyl group, such as 4-amino-2-methyl-1-butanol (in this specification, abbreviated as "AMB" in some cases) ($NH_2(CH_2)_2CH(CH_3)CH_2OH$) (molecular weight: 103).

Heterocyclic amino compounds: Compounds having a heterocyclic ring and an amino group, such as tetrahydrofurfuryl amine (in this specification, abbreviated as "FAM" in some cases) (structure represented by the following formula) (molecular weight: 101).

Amino acid compounds: Basic amino acid compounds, such as arginine (molecular weight: 174) and lysine (molecular weight: 146); amino acid compounds each having an amide group, such as asparagine (molecular weight: 132) and glutamine (molecular weight: 146); and other amino acid compounds, such as glycine (molecular weight: 75) and phenylalanine (molecular weight: 165).

The first organic compound may be the amino acid and the amino acid compound. Among them, arginine (molecular weight: 174), lysine (molecular weight: 146), and histidine (molecular weight: 155), each of which is a basic amino acid, are preferable. The second organic compound may be a peptide or a derivative thereof. Among them aspartame (molecular weight: 294), which is a methyl ester of a dipeptide of phenylalanine and asparaginic acid, is preferable.

Each of those low molecular weight amino compounds has a high water solubility, is stable in the form of an aqueous solution, and reacts with the carboxyl group of the membrane to bind to the reverse osmosis membrane, thereby forming a water insoluble salt. Accordingly, holes formed by degradation of the membrane are filled up, and as a result, the rejection of the membrane is increased.

The low molecular weight amino compounds may be used alone, or at least two types thereof may be used in combination. When an aqueous solution containing at least two types of low molecular weight amino compounds having different molecular weights and skeleton structures is allowed to pass through a permeable membrane, the compounds interfere with each other when being allowed to pass through the membrane, and as a result, the residence time of each compound at degraded portions in the membrane is increased. Accordingly, the contact probability between the carboxyl group of the membrane and the amino group of the low molecular weight amino compound is increased, and hence, an effect of restoring the membrane is enhanced.

The concentration of the first organic compound in the rejection improving aqueous solution is preferably 0.1 to 500 mg/L and particularly preferably 0.5 to 100 mg/L, and the concentration of the second organic compound is preferably 0.1 to 500 mg/L and particularly preferably 0.5 to 100 mg/L.

The third organic compound having a molecular weight of 500 or more (preferably 500 to 500,000 and particularly preferably 500 to 50,000) preferably has a carboxyl group, an amino group, or a hydroxyl group. The third organic compound is preferably a tannin or a peptide. The tannin may be tannins extracted from plants, such as hydrolysable type sumac gallnut and gallnut and condensed type quebracho and mimosa. The peptide may be a polyglycine, a polylysine, a polytryptophan, or a polyalanine which has a molecular weight of 500 or more.

The concentration of the third organic compound in the rejection improving aqueous solution is preferably 0.1 to 500 mg/L and in particular, preferably approximately 0.5 to 100 mg/L.

When the total concentration of the first, the second, and the third organic compounds in the rejection improving aqueous solution is excessively high, the permeation flux may be remarkably reduced in some cases, and the amounts of the compounds which do not reach degraded portions are increased since the organic compounds are adsorbed on a membrane surface so as to form multiple layers. When the total amount of the first, the second, and the third organic compounds is excessively low, the membrane may not be sufficiently restored, and a water passing time required to obtain an organic-compound contact amount per membrane unit area of 2,500 mg/m$^2$ or more is unnecessarily increased. Hence, the total concentration of the first and the second organic compounds in the rejection improving aqueous solution is preferably 1 to 500 mg/L and in particular, preferably approximately 1 to 300 mg/L, and the concentration of the third organic compound is preferably 1 to 500 mg/L and in particular, preferably approximately 1 to 300 mg/L.

A ratio $C_{min}/C_{max}$ of the lowest concentration $C_{min}$ among the concentrations of the first to the third organic compounds in the rejection improving aqueous solution to the highest concentration $C_{max}$ among the concentrations thereof is preferably 0.1 to 1.0. When this value is less than 0.1, holes may be unevenly restored in some cases depending on the size thereof. The concentrations of the organic compounds may be set to be equal to each other.

The rejection improving aqueous solution may contain a tracer which may be an inorganic electrolyte such as salt (NaCl), a neutral organic compound such as isopropyl alcohol or glucose, or a low molecular weight polymer such as a poly(maleic acid). When the tracer is contained in the rejection improving aqueous solution, the degree of restoring of the membrane can be confirmed by analysis of the degree of permeation of salt or glucose to water permeated through the reverse osmosis membrane.

When a water supply pressure for passing the rejection improving aqueous solution through a reverse osmosis membrane apparatus is excessively high, adsorption to non-degraded portions disadvantageously proceeds. When the water supply pressure is excessively low, adsorption to degraded portions may not proceed. Hence, the water supply pressure is preferably set to 30% to 150% and particularly preferably 50% to 130% of a normal operation pressure of the reverse osmosis membrane apparatus. When the membrane of the reverse osmosis membrane apparatus is an ultra low pressure membrane, an inlet pressure of the apparatus is preferably 0.1 to 1.0 MPa. When the membrane of the reverse osmosis membrane apparatus is a low pressure membrane, the inlet pressure of the apparatus is preferably 0.1 to 2.0 MPa. When the membrane of the reverse osmosis membrane apparatus is a seawater desalination membrane, the inlet pressure of the apparatus is preferably 0.1 to 7.0 MPa.

In the present invention, the rejection improving aqueous solution is preferably supplied to permeate through the reverse osmosis membrane so that the minimum organic-compound contact amount per membrane unit area calculated by the below equation is 2,500 mg/m$^2$ or more, preferably 2,500 to 1,000,000 mg/m$^2$, and particularly preferably 3,000 to 100,000 mg/m$^2$. When the minimum organic-compound contact amount is set as described below, the rejection of the reverse osmosis membrane is sufficiently improved. When the content of the first organic compound is represented by $C_1$ (mg/L), the content of the second organic compound is represented by $C_2$, the content of the third organic compound is represented by $C_3$ (mg/L), and the lowest concentration among $C_1$ to $C_3$ is represented by $C_{min}$, the minimum organic-compound contact amount per membrane unit area is calculated by the following equation.

Minimum organic-compound contact amount per membrane unit area=[($C_{min}$)·treatment time(Hr)· permeation flux in treatment(m³/Hr)membrane area(m²)]·1,000

In the method of the present invention, the linear velocity of the water permeating the membrane is preferably 0.1 to 5 m/d. It relates to the pressure, water temperature, shape of the membrane, and the like. When the velocity is excessively high, adsorption to non-degraded portions disadvantageously proceeds, and when the velocity is excessively low, contact efficiency to degraded portions is decreased.

The water temperature of the rejection improving aqueous solution in this rejection improving step is preferably ordinary temperature, such as approximately 10° C. to 35° C. When the water temperature is too low, the permeation flux is decreased, and the contact efficiency is decreased. When the temperature of the rejection improving aqueous solution is too high, a membrane base material may be deformed in some cases.

The time for passing the rejection improving aqueous solution is preferably set so that each organic compound is sufficiently allowed to pass through the reverse osmosis membrane. In the case in which the rejection improving aqueous solution is supplied when a normal operation of the reverse osmosis membrane apparatus is not performed, the time is preferably approximately 3 to 100 hours and in particular, preferably approximately 6 to 50 hours. When the solution passing time is excessively short, the treatment is to be completed before the fixability of the organic compounds is not obtained, and as a result, the organic compounds thus adhered may be peeled away in some cases.

The rejection improving treatment may also be performed in the normal operation of the reverse osmosis membrane apparatus, and for example, the treatment may be performed by addition of the treatment agent for improving a rejection to water to be treated in the normal operation of the reverse osmosis membrane apparatus. Although the time to add the treatment agent for improving a rejection to the water to be treated is preferably approximately 1 to 500 hours, the treatment agent for improving a rejection may always be added to water supplied to the reverse osmosis membrane apparatus.

When the permeation flux is reduced due to membrane contamination caused by a long-term operation of the reverse osmosis membrane apparatus, the rejection improving treatment may be performed after membrane cleaning is performed.

A chemical agent used for cleaning the membrane by acid may be an inorganic acid such as hydrochloric acid, nitric acid, or sulfuric acid, or an organic acid such as citric acid or oxalic acid. For alkaline cleaning, sodium hydroxide or potassium hydroxide may be used. The pH may be set to approximately 2 in the acid cleaning, while in the alkaline cleaning, the pH may be set to approximately 12.

[Reverse Osmosis Membrane]

The reverse osmosis membrane (RO membrane) may be a polymer membrane which includes an asymmetric membrane and a composite membrane. Materials for the RO membrane may be polyamide materials such as an aromatic polyamide, an aliphatic polyamide, and a composite material thereof; and cellulose materials such as a cellulose acetate. The method for improving a rejection of a reverse osmosis membrane of the present invention may be preferably applied to a permeable membrane which is formed from an aromatic polyamide material and which produces many carboxyl groups through breakage of the C—N bonds caused by degradation.

When the salt rejection of an RO membrane which is not treated by the rejection improving treatment is 95% or less and in particular 90% or less, the method of the present invention may be preferably applied to the membrane.

A module system of the reverse osmosis membrane is not particularly limited, but may be a tubular membrane module, a planar membrane module, a spiral membrane module, and a hollow-fiber membrane module.

The reverse osmosis membrane treated by the method of the present invention is effectively applied to a water treatment for recovery and recycle of wastewater containing a high- or a low-concentration TOC to be discharged from an electronic device production field, a semiconductor production field, and other various industrial fields or a water treatment for ultrapure water production using industrial water or city water and other fields. The water to be treated by the reverse osmosis membrane apparatus may contain organic substances having a TOC of 0.01 to 100 mg/L and preferably approximately 0.1 to 30 mg/L. The water containing the organic substances as described above may be wastewater from electronic device production works, wastewater from transport machinery production works, wastewater from organic synthesis works, wastewater from printing/plate making/painting works, or primary wastewater thereof. However, the water containing organic substances is not limited thereto.

EXAMPLES

Hereinafter, with reference to Examples and Comparative Examples, the present invention will be described in more detail.

In the following Comparative Examples 1 to 9 and Examples 1 to 3, a flat membrane test device shown in FIG. 2 was used.

In this flat membrane test device, a flat membrane cell 2 was provided at an intermediate position in a height direction of a cylindrical container 1 having a bottom and a lid to partition the container into a raw water chamber 1A and a permeated water chamber 1B, and this container 1 was placed on a stirrer 3. While water to be treated was supplied to the raw water chamber 1A by a pump 4 through a pipe 11, and the inside of the raw water chamber 1A was stirred by rotating a stirring bar 5 in the container 1, permeated water was extracted from the permeated water chamber 1B through a pipe 12, and at the same time, brine was extracted from the raw water chamber 1A through a pipe 13. A pressure gauge 6 and a pressure regulation valve 7 were provided for the brine extracting pipe 13.

Comparative Example 1

As a membrane of the flat membrane cell 2, the following degraded membrane was used.

Degraded membrane: Ultra low pressure reverse osmosis membrane ES20 manufactured by Nitto Denko Corporation was rapidly degraded by immersion in a solution containing sodium hypochlorite (free chlorine: 1 mg/L) for 24 hours. The permeation flux, salt rejection, and IPA rejection of an original membrane (new ES20 membrane which was not degraded) were 0.81 m³/(m²·d), 0.972, and 0.875, respectively.

The following water to be treated was supplied to this test device for 2 hours.

Water to be treated: Water prepared by a dechlorination treatment of tap water in Nogimachi, Tochigi prefecture, Japan with active carbon and by addition of NaCl and IPA so as to have concentrations of 500 mg/L and 100 mg/L, respectively.

Operation pressure: 0.75 MPa
Temperature: 24° C.±2° C.

Comparative Example 2

Water was passed under the same conditions as those of Comparative Example 1 except that a tannic acid (403040-50G manufactured by Sigma-Aldrich Co. LLC) was added to the water to be treated to have a concentration of 1 mg/L.

Comparative Example 3

Water was passed under the same conditions as those of Comparative Example 1 except that a poly(ethylene glycol) (molecular weight: 4,000, manufactured by Wako Pure Chemical Industries, Ltd.) was added to the water to be treated to have a concentration of 1 mg/L.

Comparative Example 4

Water was passed under the same conditions as those of Comparative Example 1 except that a poly(oxyethylene(10) oleyl ether) (molecular weight: 708, manufactured by Wako Pure Chemical Industries, Ltd.) was added to the water to be treated to have a concentration of 1 mg/L.

Comparative Example 5

Water was passed under the same conditions as those of Comparative Example 1 except that aspartame (molecular weight: 294, a food additive grade, manufactured by Ajinomoto Co., Inc.) was added to the water to be treated to have a concentration of 1 mg/L.

Comparative Example 6

Water was passed under the same conditions as those of Comparative Example 1 except that arginine (molecular weight: 174, a food additive grade, manufactured by Ajinomoto Co., Inc.) was added to the water to be treated to have a concentration of 1 mg/L.

Comparative Example 7

Water was passed under the same conditions as those of Comparative Example 1 except that arginine and aspartame were added to the water to be treated to have concentrations of 2 mg/L and 1 mg/L, respectively.

Example 1

Water was passed under the same conditions as those of Comparative Example 1 except that water supply was performed for 24 hours by adding arginine, aspartame, and a polyglycine (P8791-500MG, molecular weight: 500 to 5,000, manufactured by Sigma-Aldrich Co. LLC) to the water to be treated to have concentrations of 2 mg/L, 1 mg/L, and 1 mg/L, respectively.

Example 2

Water was passed under the same conditions as those of Comparative Example 1 except that water supply was performed for 24 hours by adding arginine, aspartame, and food-additive tannic acid AL (molecular weight: 500 or more, manufactured by Fuji Chemical Industry Co., Ltd.) to the water to be treated to have concentrations of 2 mg/L, 1 mg/L, and 1 mg/L, respectively.

The permeation flux, salt rejection, and IPA rejection were calculated from the following equations.

$$\text{Permeation flux}[m^3/(m^2 \cdot d)] = \text{permeation flux}[m^3/d]/\text{membrane surface}[m^2] \cdot \text{temperature conversion coefficient}[-]$$

$$\text{Salt rejection}[\%] = (1 - \text{conductivity of permeated water}[mS/m]/\text{conductivity of brine}[mS/m]) \cdot 100$$

$$\text{IPA rejection}[\%] = (1 - \text{TOC of permeated water}[mg/L]/\text{TOC of brine water}[mg/L]) \cdot 100$$

The results are shown in Table 1. It is understood that according to the present invention, improvement efficiency of the salt rejection and that of the IPA rejection are high, and the salt rejection and the IPA rejection are approximately equivalent to or more than those of the original membrane.

TABLE 1

|  | DEGRADED STATE | | | AFTER 2 HOURS OF WATER SUPPLY | | |
| --- | --- | --- | --- | --- | --- | --- |
|  | PERMEATION FLUX $[m^3/(m^2 d)]$ | SALT REJECTION [%] | IPA REJECTION [%] | PERMEATION FLUX $[m^3/(m^2 d)]$ | SALT REJECTION [%] | IPA REJECTION [%] |
| ORIGINAL | 0.81 | 97.2 | 87.5 |  |  |  |
| COMPARATIVE EXAMPLE 1 | 0.95 | 89.8 | 74.1 | 0.95 | 89.8 | 74.0 |
| COMPARATIVE EXAMPLE 2 | 0.94 | 89.9 | 74.0 | 0.90 | 92.8 | 78.7 |
| COMPARATIVE EXAMPLE 3 | 0.96 | 89.7 | 73.9 | 0.78 | 94.6 | 83.3 |
| COMPARATIVE EXAMPLE 4 | 0.95 | 89.8 | 74.0 | 0.71 | 95.9 | 84.5 |
| COMPARATIVE EXAMPLE 5 | 0.96 | 89.7 | 73.9 | 0.94 | 92.3 | 76.6 |
| COMPARATIVE EXAMPLE 6 | 0.96 | 89.7 | 74.0 | 0.95 | 91.7 | 75.8 |
| COMPARATIVE EXAMPLE 7 | 0.95 | 89.8 | 74.0 | 0.92 | 93.3 | 77.2 |

TABLE 1-continued

| | | | | | | |
|---|---|---|---|---|---|---|
| EXAMPLE 1 | 0.96 | 89.7 | 73.9 | 0.90 | 93.8 | 77.9 |
| EXAMPLE 2 | 0.95 | 89.8 | 74.0 | 0.89 | 94.0 | 78.4 |

| | AFTER 24 HOURS OF WATER SUPPLY | | | AFTER 96 HOURS OF WATER SUPPLY | | |
|---|---|---|---|---|---|---|
| | PERMEATION FLUX [m³/(m²d)] | SALT REJECTION [%] | IPA REJECTION [%] | PERMEATION FLUX [m³/(m²d)] | SALT REJECTION [%] | IPA REJECTION [%] |
| ORIGINAL COMPARATIVE EXAMPLE 1 | 0.94 | 89.9 | 74.1 | 0.94 | 89.9 | 74.2 |
| COMPARATIVE EXAMPLE 2 | 0.83 | 95.4 | 82.3 | 0.76 | 96.6 | 85.0 |
| COMPARATIVE EXAMPLE 3 | 0.79 | 94.5 | 83.2 | 0.8 | 94.5 | 83.2 |
| COMPARATIVE EXAMPLE 4 | 0.71 | 95.9 | 84.5 | 0.72 | 95.8 | 84.3 |
| COMPARATIVE EXAMPLE 5 | 0.92 | 93.5 | 79.0 | 0.89 | 94.0 | 80.2 |
| COMPARATIVE EXAMPLE 6 | 0.93 | 92.9 | 77.9 | 0.92 | 93.4 | 78.6 |
| COMPARATIVE EXAMPLE 7 | 0.89 | 94.1 | 82.6 | 0.87 | 94.9 | 84.6 |
| EXAMPLE 1 | 0.87 | 96.0 | 83.7 | 0.82 | 97.3 | 87.5 |
| EXAMPLE 2 | 0.86 | 96.4 | 84.1 | 0.8 | 97.8 | 87.7 |

Comparative Example 8

Figure 2:
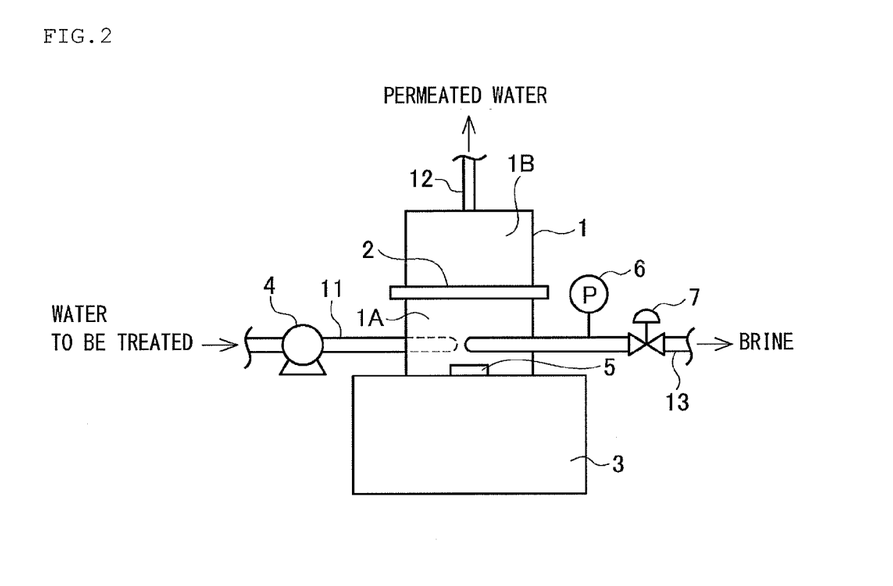
FIG. 2 is a schematic view showing a flat membrane test device used in Examples.

The following degraded membrane was fitted to the flat membrane test device shown in FIG. 2, and the following water to be treated was supplied therethrough for 2 hours under the following conditions.

Degraded membrane: After 8-inch low pressure reverse osmosis membrane NTR759HR manufactured by Nitto Denko Corporation used for wastewater recovery was immersed in an aqueous NaOH solution at a pH of 12 for 15 hours and was then rinsed with purified water, the membrane was immersed in citric acid at a concentration of 2% for 2 hours and was then rinsed with purified water.

Water to be treated: NaCl and IPA were dissolved in purified water to have concentrations of 500 mg/L and 100 mg/L, respectively.

Operation pressure: 1.4 MPa

Temperature: 24° C.±2° C.

Comparative Example 9

Water was passed under the same conditions as those of Comparative Example 8 except that PEG4000 (poly(ethylene glycol) having a molecular weight of 4,000, manufactured by Wako Pure Chemical Industries, Ltd.) was added to the water to be treated to have a concentration of 5 mg/L.

Example 3

Water was passed under the same conditions as those of Comparative Example 8 except that arginine, aspartame, and food additive tannic acid AL (molecular weight: 500 or more, manufactured by Fuji Chemical Industry Co., Ltd.) were added to the water to be treated to have a concentrations of 20 mg/L, 20 mg/L, and 10 mg/L, respectively.

The results are shown in Table 2. As shown in Table 2, according to the present invention, a decrease in permeation flux can be suppressed within 10%, and the salt rejection and the IPA rejection can be significantly improved.

TABLE 2

| | AFTER 5 MINUTES OF WATER SUPPLY | | | AFTER 2 HOURS OF WATER SUPPLY | | |
|---|---|---|---|---|---|---|
| | PERMEATION FLUX [m³/(m²d)] | SALT REJECTION [%] | IPA REJECTION [%] | PERMEATION FLUX [m³/(m²d)] | SALT REJECTION [%] | IPA REJECTION [%] |
| COMPARATIVE EXAMPLE 8 | 1.03 | 95.2 | 92.1 | 1.03 | 95.3 | 92.3 |
| COMPARATIVE EXAMPLE 9 | 1.00 | 95.3 | 92.3 | 0.84 | 98.4 | 95.3 |
| EXAMPLE 3 | 1.01 | 95.1 | 92.2 | 0.92 | 99.0 | 96.6 |

As apparent from the above Examples and Comparative Examples, according to the present invention, after the treatment agent for improving a rejection is added to the water to be treated, when water supply is performed at a normal operation pressure, without remarkably reducing the permeation flux, the salt rejection can be recovered while water is collected. In addition, to a seriously degraded membrane having a salt rejection of 90% or less, the present invention may also be applied.

Next, Examples 4 to 14 and Comparative Example 10 will be described.

In the following Examples 4 to 14 and Comparative Example 10, an aqueous sodium hypochlorite solution (pH: 7.0) at a concentration of 100 ppm was supplied through an RO apparatus equipped with an ultra low pressure RO membrane ESPA2-4040 (membrane surface area: 7.9 m²) manufactured by Hydranautics for 500 hours at an inlet pressure of 0.75 MPa, a brine water flow of 1 m³/h, and a water temperature of 25° C., so that the RO membrane was degraded. The rejection improving treatment was performed on this degraded RO membrane, and performances thereof before and after the treatment were evaluated. For the performance evaluation, an aqueous solution (pH: 7.0) containing NaCl and IPA at concentrations of 500 ppm and 100 ppm, respectively, was supplied through the RO apparatus at an inlet pressure of 0.75 MPa, a brine flow of 1 m³/h, and a water temperature of 25° C., and subsequently, the salt rejection (NaCl removal rate), IPA (isopropyl alcohol) rejection, and permeation flux (m³/Hr) were measured.

Example 4

Synthetic raw water (pH: 7.0) containing arginine (molecular weight: 174, manufactured by Ajinomoto Co., Inc.) as a first organic compound, aspartame (molecular weight: 294, manufactured by Ajinomoto Co., Inc.) as a second organic compound, and tannic acid AL (molecular weight: 500 or more, manufactured by Fuji Chemical Industry Co., Ltd.) as a third organic compound, each having a concentration of 10 mg/L, was allowed to pass for 50 hours at an inlet pressure of 0.2 MPa, a brine pressure of 0.17 MPa, a permeation flux of 0.1 m³/Hr (0.3 m/d), a brine flow of 1 m³/h, and a water temperature of 25° C. The organic-compound contact amount per membrane unit area was $[10 \cdot 50 \cdot 0.1/7.9] \times 1{,}000 \cong 6{,}300$ mg/m².

The above treatment conditions are shown in Table 3, and the performance evaluation results are shown in Table 4.

Examples 5 to 15

The rejection improving treatment was performed in the same manner as Example 4 except that the conditions of the rejection improving treatment were set as shown in Table 3. The performance evaluation results are shown in Table 4.

The salt rejection (NaCl removal rate) and the IPA rejection were calculated from the following equations. In Table 4, the salt rejection was represented by the NaCl rejection.

$$\text{NaCl rejection}[\%] = \{1 - \text{conductivity of permeated water}[mS/m] \cdot 2 / (\text{conductivity of water to be treated}[mS/m] + \text{conductivity of brine}[mS/m])\} \cdot 100$$

$$\text{IPA rejection}[\%] = \{1 - \text{TOC of permeated water}[mg/L] \cdot 2 / (\text{TOC of water to be treated}[mg/L] + \text{TOC of brine}[mg/L])\} \cdot 100$$

TABLE 3

| | ORGANIC COMPOUND | | | ADDITION AMOUNT OF ORGANIC COMPOUND (mg/L) | | | INLET PRESSURE (MPa) |
| --- | --- | --- | --- | --- | --- | --- | --- |
| | FIRST | SECOND | THIRD | FIRST | SECOND | THIRD | |
| EXAMPLE 4 | ARGININE | ASPARTAME | TANNIC ACID | 10 | 10 | 10 | 0.2 |
| EXAMPLE 5 | ARGININE | ASPARTAME | TANNIC ACID | 3 | 3 | 3 | 0.75 |
| EXAMPLE 6 | ARGININE | ASPARTAME | TANNIC ACID | 100 | 100 | 100 | 0.2 |
| EXAMPLE 7 | ARGININE | ASPARTAME | TANNIC ACID | 100 | 100 | 100 | 0.75 |
| EXAMPLE 8 | ARGININE | ASPARTAME | TANNIC ACID | 50 | 50 | 10 | 0.75 |
| EXAMPLE 9 | ARGININE | ASPARTAME | TANNIC ACID | 10 | 10 | 50 | 0.75 |
| EXAMPLE 10 | ARGININE | ASPARTAME | TANNIC ACID | 50 | 10 | 50 | 0.75 |
| EXAMPLE 11 | GLYCINE | ASPARTAME | TANNIC ACID | 20 | 20 | 20 | 0.75 |
| EXAMPLE 12 | ASPARAGINE | ASPARTAME | POLYGLYCINE | 20 | 20 | 20 | 0.75 |
| EXAMPLE 13 | GLUTAMINE | ASPARTAME | POLYLYSINE | 20 | 20 | 20 | 0.75 |
| EXAMPLE 14 | PHENYLALANINE | ASPARTAME | POLYALANINE | 20 | 20 | 20 | 0.75 |
| EXAMPLE 15 | ARGININE | ASPARTAME | TANNIC ACID | 1 | 1 | 1 | 0.75 |

| | BRINE PRESSURE (MPa) | PERMEATION FLUX (m³/Hr) | BRINE FLOW (m³/Hr) | TREATMENT TIME (Hr) | ORGANIC-COMPOUND CONTACT AMOUNT PER MEMBRANE UNIT AREA (mg/m²) |
| --- | --- | --- | --- | --- | --- |
| EXAMPLE 4 | 0.17 | 0.1 | 1 | 50 | 6,300 |
| EXAMPLE 5 | 0.73 | 0.35 | 1 | 24 | 3,200 |
| EXAMPLE 6 | 0.17 | 0.1 | 1 | 6 | 7,600 |
| EXAMPLE 7 | 0.73 | 0.35 | 1 | 3 | 13,300 |
| EXAMPLE 8 | 0.73 | 0.35 | 1 | 50 | 22,200 |
| EXAMPLE 9 | 0.73 | 0.35 | 1 | 50 | 22,200 |
| EXAMPLE 10 | 0.73 | 0.35 | 1 | 50 | 22,200 |
| EXAMPLE 11 | 0.73 | 0.35 | 1 | 12 | 10,600 |
| EXAMPLE 12 | 0.73 | 0.35 | 1 | 12 | 10,600 |
| EXAMPLE 13 | 0.73 | 0.35 | 1 | 12 | 10,600 |
| EXAMPLE 14 | 0.73 | 0.35 | 1 | 12 | 10,600 |
| EXAMPLE 15 | 0.73 | 0.35 | 1 | 24 | 1,100 |

TABLE 4

| | PERFORMANCE BEFORE TREATMENT | | | PERFORMANCE AFTER TREATMENT | | |
|---|---|---|---|---|---|---|
| | NaCl REJECTION (%) | IPA REJECTION (%) | PERMEATION FLUX (m³/h) | NaCl REJECTION (%) | IPA REJECTION (%) | PERMEATION FLUX (m³/h) |
| EXAMPLE 4 | 90.4 | 65.0 | 0.35 | 98.5 | 77.1 | 0.30 |
| EXAMPLE 5 | 89.4 | 67.5 | 0.34 | 98.2 | 78.3 | 0.31 |
| EXAMPLE 6 | 91.1 | 66.6 | 0.34 | 99.00 | 77.2 | 0.31 |
| EXAMPLE 7 | 89.9 | 69.3 | 0.36 | 98.1 | 74.8 | 0.32 |
| EXAMPLE 8 | 90.2 | 65.5 | 0.34 | 98.4 | 77.9 | 0.31 |
| EXAMPLE 9 | 88.8 | 63.5 | 0.37 | 98.0 | 75.0 | 0.31 |
| EXAMPLE 10 | 89.8 | 67.6 | 0.36 | 98.5 | 76.3 | 0.32 |
| EXAMPLE 11 | 90.5 | 66.3 | 0.35 | 98.4 | 76.4 | 0.31 |
| EXAMPLE 12 | 89.1 | 67.4 | 0.34 | 97.8 | 74.3 | 0.31 |
| EXAMPLE 13 | 89.7 | 65.9 | 0.35 | 97.9 | 74.9 | 0.31 |
| EXAMPLE 14 | 90.1 | 66.2 | 0.35 | 97.6 | 75.2 | 0.32 |
| EXAMPLE 15 | 89.3 | 65.8 | 0.35 | 94.5 | 70.5 | 0.33 |

As shown in Table 4, according to the present invention, the rejection performance can be maximally recovered by the rejection improving treatment. When the minimum organic-compound contact amount per membrane unit area is set to 2,500 mg/m² or more as the goal, the treatment period is clearly defined, and hence an efficient operation may be performed in accordance with the operation conditions (pressure and treatment time).

Although specific modes of the present invention have been described in detail, it is apparent to a person skilled in the art that various changes and modifications of the present invention may be carried out without departing from the concept and scope of the present invention.

The present application is based on Japanese Patent Application 2011-051530 filed on Mar. 9, 2011 and 2012-035277 filed on Feb. 21, 2012, the entire contents of which are hereby incorporated by reference.

The invention claimed is:

1. A method for improving a rejection of a reverse osmosis polyamide membrane, comprising:
    a step of passing an aqueous solution containing a first organic compound having a molecular weight of less than 200, a second organic compound having a molecular weight of 200 to less than 500, and a third organic compound having a molecular weight of 500 or more through the reverse osmosis polyamide membrane, thereby forming a water insoluble salt with the first organic compound and the second organic compound reacting with a carboxyl group of the reverse osmosis membrane to bind to the reverse osmosis membrane and fill up holes formed thereon by degradation of the reverse osmosis membrane, and improving the rejection rate of the reverse osmosis membrane,
    wherein the first organic compound is at least one composition selected from the group consisting of an aromatic amino compound, an aromatic amino carboxylic acid compound, an aliphatic amino compound, an aliphatic amino alcohol, a heterocyclic amino compound, and an amino acid compound,
    the second organic compound is a peptide or a derivative thereof, and
    the third organic compound is a tannin or a peptide.

2. The method for improving a rejection of a reverse osmosis polyamide membrane according to claim 1, wherein a total concentration of the first organic compound and the second organic compound is 1 to 500 mg/L, and
    a concentration of the third organic compound is 1 to 500 mg/L.

3. The method for improving a rejection of a reverse osmosis polyamide membrane according to claim 1, wherein the second organic compound is aspartame.

4. The method for improving a rejection of a reverse osmosis polyamide membrane according to claim 3, wherein the first organic compound is arginine and the third organic compound is tannic acid.

5. The method for improving a rejection of a reverse osmosis polyamide membrane according to claim 3, wherein the first organic compound is glycine and the third organic compound is tannic acid.

6. The method for improving a rejection of a reverse osmosis polyamide membrane according to claim 3, wherein the first organic compound is asparagine and the third organic compound is polyglycine.

7. The method for improving a rejection of a reverse osmosis polyamide membrane according to claim 3, wherein the first organic compound is glutamine and the third organic compound is polylysine.

8. The method for improving a rejection of a reverse osmosis polyamide membrane according to claim 3, wherein the first organic compound is phenylalanine and the third organic compound is polyalanine.

9. The method for improving a rejection of a reverse osmosis polyamide membrane according to claim 3, wherein the first organic compound is arginine and the third organic compound is polyglycine.

10. The method for improving a rejection of a reverse osmosis polyamide membrane according to claim 3, wherein the first organic compound is diamino benzene and the third organic compound is tannic acid.

11. The method for improving a rejection of a reverse osmosis polyamide membrane according to claim 3, wherein the first organic compound is octylamine and the third organic compound is tannic acid.

12. The method for improving a rejection of a reverse osmosis polyamide membrane according to claim 3, wherein the first organic compound is 3,5-diamino benzoic acid and the third organic compound is tannic acid.

13. The method for improving a rejection of a reverse osmosis polyamide membrane according to claim 3, wherein the first organic compound is 3,4-diamino benzoic acid and the third organic compound is tannic acid.

14. The method for improving a rejection of a reverse osmosis polyamide membrane according to claim 3, wherein the first organic compound is 2,4-diamino benzoic acid and the third organic compound is tannic acid.

15. The method for improving a rejection of a reverse osmosis polyamide membrane according to claim 3, wherein the first organic compound is 2,5-diamino benzoic acid and the third organic compound is tannic acid.

16. The method for improving a rejection of a reverse osmosis polyamide membrane according to claim 3, wherein the first organic compound is 2,4,6-triamino benzoic acid and the third organic compound is tannic acid.

17. The method for improving a rejection of a reverse osmosis polyamide membrane according to claim 3, wherein the first organic compound is 1,9-diaminononane and the third organic compound is tannic acid.

18. The method for improving a rejection of a reverse osmosis polyamide membrane according to claim 3, wherein the first organic compound is 1-aminopentane and the third organic compound is tannic acid.

19. The method for improving a rejection of a reverse osmosis polyamide membrane according to claim 3, wherein the first organic compound is 2-methyl-1,8-octanediamine and the third organic compound is tannic acid.

20. The method for improving a rejection of a reverse osmosis polyamide membrane according to claim 3, wherein the first organic compound is tetrahydrofurfuryl amine and the third organic compound is tannic acid.

* * * * *